US012455911B2

(12) United States Patent
M'hamdi et al.

(10) Patent No.: US 12,455,911 B2
(45) Date of Patent: Oct. 28, 2025

(54) CROSS-LINGUAL META-TRANSFER LEARNING ADAPTATION TO NATURAL LANGUAGE UNDERSTANDING

(71) Applicant: ADOBE INC., San Jose, CA (US)

(72) Inventors: Meryem M'hamdi, Los Angeles, CA (US); Doo Soon Kim, San Jose, CA (US); Franck Dernoncourt, San Jose, CA (US); Trung Huu Bui, San Jose, CA (US)

(73) Assignee: ADOBE INC., San Jose, CA (US)

( * ) Notice: Subject to any disclaimer, the term of this patent is extended or adjusted under 35 U.S.C. 154(b) by 482 days.

(21) Appl. No.: 17/655,395

(22) Filed: Mar. 18, 2022

(65) Prior Publication Data

US 2023/0297603 A1   Sep. 21, 2023

(51) Int. Cl.
*G06F 16/334* (2025.01)
*G06F 40/279* (2020.01)
*G06F 40/35* (2020.01)
*G06N 20/00* (2019.01)

(52) U.S. Cl.
CPC ........ *G06F 16/3344* (2019.01); *G06F 40/279* (2020.01); *G06F 40/35* (2020.01); *G06N 20/00* (2019.01)

(58) Field of Classification Search
CPC ..... G06F 40/279; G06F 40/35; G06F 16/3344
See application file for complete search history.

(56) References Cited

U.S. PATENT DOCUMENTS

2021/0065690 A1*   3/2021   Indurthi ............... G10L 15/183
2021/0248471 A1*   8/2021   Jiao ....................... G06N 3/084

OTHER PUBLICATIONS

1M'hamdi, et al. "X-METRA-ADA: Cross-lingual Meta-Transfer Learning Adaptation to Natural Language Understanding and Question Answering", arXiv preprint arXiv:2104.09696v2 [cs.CL] Jun. 1, 2021. 16 pages.

* cited by examiner

*Primary Examiner* — Thomas H Maung
(74) *Attorney, Agent, or Firm* — F. CHAU & ASSOCIATES, LLC

(57) ABSTRACT

Systems and methods for natural language processing are described. Embodiments of the present disclosure identify a task set including a plurality of pseudo tasks, wherein each of the plurality of pseudo tasks includes a support set corresponding to a first natural language processing (NLP) task and a query set corresponding to a second NLP task; update a machine learning model in an inner loop based on the support set; update the machine learning model in an outer loop based on the query set; and perform the second NLP task using the machine learning model.

13 Claims, 10 Drawing Sheets

Algorithm 1 X-METRA-ADA

Require: Task set distribution $\mathcal{D}$, pre-trained learner $B$ with parameters $\theta_B$, meta-learner $M$ with parameters $(\theta, \alpha, \beta, n)$ 1: Initialize $\theta \leftarrow \theta_B$
2: while not done do
3:     Sample batch of tasks $\mathcal{T} = \{T_1, T_2, \ldots T_b\} \sim \mathcal{D}$
4:     for all $T_j = (S_j, Q_j)$ in $\mathcal{T}$ do
5:         Initialize $\theta_j \leftarrow \theta$
6:         for $t = 1 \ldots n$ do
7:             Evaluate $\partial B_{\theta_j}/\partial \theta_j = \nabla_{\theta_j}\mathcal{L}_{T_j}^{S_j}(B_{\theta_j})$
8:             Update $\theta_j = \theta_j - \alpha \partial B_{\theta_j}/\partial \theta_j$
9:         end for
10:        Evaluate query loss $\mathcal{L}_{T_j}^{Q_j}(B_{\theta_j})$ and save it for outer loop
11:     end for
12:     Update $\theta \leftarrow \theta - \beta \nabla_\theta \sum_{j=1}^{b} \mathcal{L}_{T_j}^{Q_j}(B_{\theta_j})$
13: end while

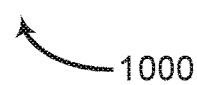

FIG. 10

CROSS-LINGUAL META-TRANSFER LEARNING ADAPTATION TO NATURAL LANGUAGE UNDERSTANDING

BACKGROUND

The following relates generally to natural language processing, and more specifically to natural language understanding. Natural language processing (NLP) refers to techniques for using computers to interpret or generate natural language. Cross-lingual transfer learning is a field within NLP that adapts a machine learning model trained on a task in a source language to generalize to the same task in other languages. In some cases, cross-lingual transfer learning relies on common cross-lingual representations to bridge the gap between different language resources. Accordingly, an NLP application is scalable to multiple languages.

However, conventional multi-lingual models and transfer learning are not able to handle languages with different typological characteristics. For example, Thai or Siamese is considered a low-resource language and contains typological characteristics which are very different from English. Therefore, there is a need in the art for an improved language processing system that can be trained efficiently and is scalable to low-resource languages.

SUMMARY

The present disclosure describes systems and methods for natural language understanding. Embodiments of the present disclosure include a language processing apparatus comprising a machine learning model (e.g., a down-stream model) and a training component (e.g., upstream training component). The task specific base model is a multi-lingual task-oriented dialog (MTOD) network or a typologically diverse question answering (TyDiQA) network. In some examples, the machine learning model is trained to perform a task in one language. The training component of the language processing apparatus trains the machine learning model to perform the task in another language using two-stage meta-learning (i.e., meta-train and meta-adapt). The two-stage meta-learning is based on selecting pseudo-tasks that include samples from both task datasets, and performing a nested loop algorithm using the different sets.

A method, apparatus, and non-transitory computer readable medium for training a machine learning model are described. One or more embodiments of the method, apparatus, and non-transitory computer readable medium include identifying a task set including a plurality of pseudo tasks, wherein each of the plurality of pseudo tasks includes a support set corresponding to a first natural language processing (NLP) task and a query set corresponding to a second NLP task; updating a machine learning model in an inner loop based on the support set; updating the machine learning model in an outer loop based on the query set; and performing the second NLP task using the machine learning model.

A method, apparatus, and non-transitory computer readable medium for training a machine learning model are described. One or more embodiments of the method, apparatus, and non-transitory computer readable medium include identifying a task set including a plurality of pseudo tasks, wherein each pseudo task of the plurality of pseudo tasks includes a support set and a query set; computing a support loss for the pseudo task based on the support set; updating a machine learning model based on a gradient of the support loss; computing a query loss for the pseudo task based on the updated machine learning model; and updating the machine learning model based on a gradient of a sum of the query loss over the plurality of pseudo tasks.

An apparatus and method for training a machine learning model are described. One or more embodiments of the apparatus and method include a machine learning model that is trained to perform a first NLP task and a training component configured to identify a task set including a plurality of pseudo tasks, wherein each of the plurality of pseudo tasks includes a support set corresponding to the first NLP task and a query set corresponding to a second NLP task, to update the machine learning model in an inner loop based on the support set, and to update the machine learning model in an outer loop based on the query set.

BRIEF DESCRIPTION OF THE DRAWINGS

FIG. 10 shows an example of an algorithm for training a machine learning model according to aspects of the present disclosure.

DETAILED DESCRIPTION

Figure 1:
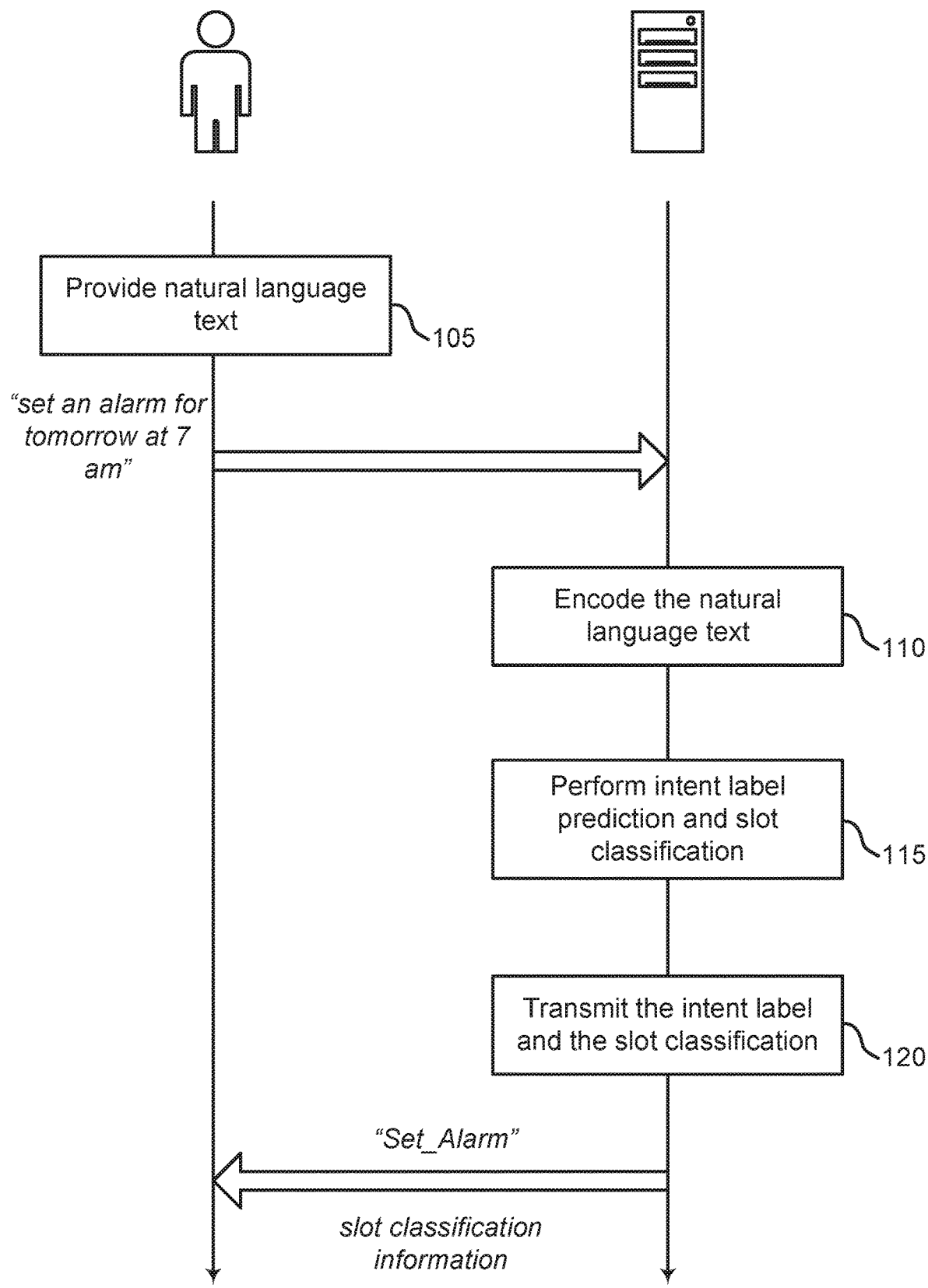
FIG. 1 shows an example of natural language understanding according to aspects of the present disclosure.

The present disclosure describes systems and methods for natural language understanding. Embodiments of the present disclosure include a language processing apparatus comprising a machine learning model (e.g., a task specific base model) and a training component. In some examples, the task specific base model is a multi-lingual task-oriented dialog (MTOD) network or a typologically diverse question answering (TyDiQA) network. The machine learning model is trained to perform a task in one language. The training component of the language processing apparatus trains the machine learning model to perform the task in another language using two-stage meta-learning method (i.e., meta-train and meta-adapt). The two-stage meta-learning is based on selecting pseudo-tasks that include samples from both task datasets, and performing a nested loop algorithm using the different sets.

In some embodiments, the training component identifies a task set including a set of pseudo tasks, where each of the set of pseudo tasks includes a support set corresponding to a first natural language processing (NLP) task (e.g., the first NLP task involves intent detection in English) and a query set corresponding to a second NLP task. The training component updates a machine learning model in an inner loop based on the support set, and updates the machine learning model in an outer loop based on the query set. The machine learning model after meta-learning performs the second NLP task (e.g., intent detection in a low-resource language such as Thai).

Recently, cross-lingual transfer learning is used in applications such as information retrieval, information extraction, and chatbot applications. Transfer learning technique is also applied to cross-lingual task-oriented dialog. In some cases, cross-lingual joint training outperforms monolingual training. Some other examples include latent variable model combined with cross-lingual refinement, and transformer-based embeddings with mixed language training to learn inter-lingual semantics across different languages.

However, these conventional language processing models often face imperfect alignments in the cross-lingual representations and are not scalable to certain other languages (e.g., Thai or Siamese). For example, their learned refined alignments using the conventional systems have worse performance when compared to machine translation models in low-resource and typologically diverse languages (i.e., the degree of typological commonalities among languages).

Meta-learning is referred to as a method of "learning to learn" and meta-learning is used in computer vision, natural language understanding, and speech recognition tasks. Embodiments of the present disclosure provide two-stage meta-learning methods for cross-lingual transfer learning in natural language understanding (NLU) tasks. A meta-train stage transfers from the source language to the target languages, while a subsequent meta-adaptation stage further adapts a machine learning model to the target language. In some examples, English is treated as the source language and Spanish as the target language. The present disclosure can be applied to few-shot if the test language is seen in any stage or zeroshot if the test language is unseen. The two-stage meta-learning (i.e., meta-train and meta-adapt), via the nested loop algorithm, ensures a machine learning model to learn from examples of a target language under low resource scenario.

In some embodiments, a language processing apparatus comprises a machine learning model (e.g., a task specific base model) and a training component. The task specific base model is a multi-lingual task-oriented dialog (MTOD) network or a typologically diverse question answering (TyDiQA) network. In some examples, a machine learning model is trained to perform a task in one language. The training component of the language processing apparatus trains the machine learning model to perform the task in another language using two-stage meta-learning (i.e., meta-train and meta-adapt). The two-stage meta-learning is based on selecting pseudo-tasks that include samples from both task datasets, and performing a nested loop algorithm using the different sets.

In some embodiments, the language processing apparatus identifies a task set including a set of pseudo tasks, where each pseudo task of the set of pseudo tasks includes a support set and a query set. The support set comprises high-resource language data (e.g., English) and the query set comprises low-resource language data (e.g., Thai, Italian, etc.). A training component of the language processing apparatus updates a machine learning model in an inner loop based on the support set. The training component updates the machine learning model in an outer loop based on the query set. Additionally, unlike conventional systems, the training component identifies a second-phase task set including a second set of pseudo tasks, where each of the second set of pseudo tasks includes a second-phase support set and a second-phase query set. The second-phase support set and the second-phase query set comprise low-resource language data from a same language. The machine learning model, after meta-learning, performs an NLP task with the target language (e.g., a low-resource language such as Thai).

By training a machine learning model through meta-train and meta-adaptation, the language processing apparatus has high convergence stability for most languages. In some examples, the language processing apparatus is evaluated in cross-lingual benchmarks comprising extensive low-resource and typologically diverse languages. At least one embodiment of the language processing apparatus is trained using meta-transfer learning for cross-lingual tasks. In some examples, cross-lingual tasks include multilingual task-oriented dialogue (MTOD) and typologically diverse question answering (TyDiQA). MTOD relates to a joint classification and sequence labelling task and is typologically diverse. The two-stage meta learning has increased performance with regards to transfer learning between typologically diverse languages than basic fine-tuning of a model.

Embodiments of the present disclosure may be used in the context of natural language understanding (NLU) applications. For example, a language processing network based on the present disclosure can perform cross-lingual NLU tasks such as multilingual task-oriented dialog and typologically diverse question answering. An example application of the inventive concept in natural language understanding context is provided with reference to FIGS. 1-2. Details regarding the architecture of an example language processing apparatus are provided with reference to FIGS. 3-6. Example processes and algorithm for training a machine learning model are provided with reference to FIGS. 7-10.

Natural Language Understanding

FIG. 1 shows an example of natural language understanding according to aspects of the present disclosure. FIG. 1 involves an example of intent detection and slot classification that can be performed by a multi-lingual task-oriented dialog (MTOD) network as described below in FIG. 5. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 105, the user provides natural language text. In some cases, the operations of this step refer to, or may be performed by, a user as described with reference to FIG. 3. Language understanding aims at extracting the meaning a user is trying to convey. In spoken language understanding (SLU), a spoken utterance is first transcribed, then semantics information is extracted. In some examples, the user says "set an alarm for tomorrow at 7 am" as a user command to conversational interfaces, e.g., Google® Home or Amazon® Alexa.

At operation 110, the system encodes the natural language text. In some cases, the operations of this step refer to, or may be performed by, a language processing apparatus as described with reference to FIGS. 3 and 4. The system extracts a semantic "frame" from a transcribed user utterance. The system is configured to perform intent detection and slot filling. The former tries to classify a user utterance into an intent, i.e., the purpose of the user. The latter tries to find what are the "arguments" of such intent.

At operation 115, the system performs intent label prediction and slot classification. In some cases, the operations of this step refer to, or may be performed by, a language processing apparatus as described with reference to FIGS. 3 and 4. For the above example, intent is to "set alarm" based on the user command. In some examples, the system predicts a slot category associated with each token in a sequence in IOB format. One slot is Time. The word "7" in the phrase "set an alarm for tomorrow at 7 am" is associated with slot annotation "B-Time", meaning beginning of time. The word "am" in the phrase is associated with slot annotation "I-Time", meaning inside of time. The word "alarm" in the phrase is associated with slot annotation "O", meaning outside of time. In some examples, intent label prediction and slot classification are performed simultaneously.

At operation 120, the system transmits the intent label and the slot classification to the user. In some cases, the operations of this step refer to, or may be performed by, a language processing apparatus as described with reference to FIGS. 3 and 4.

Figure 2:
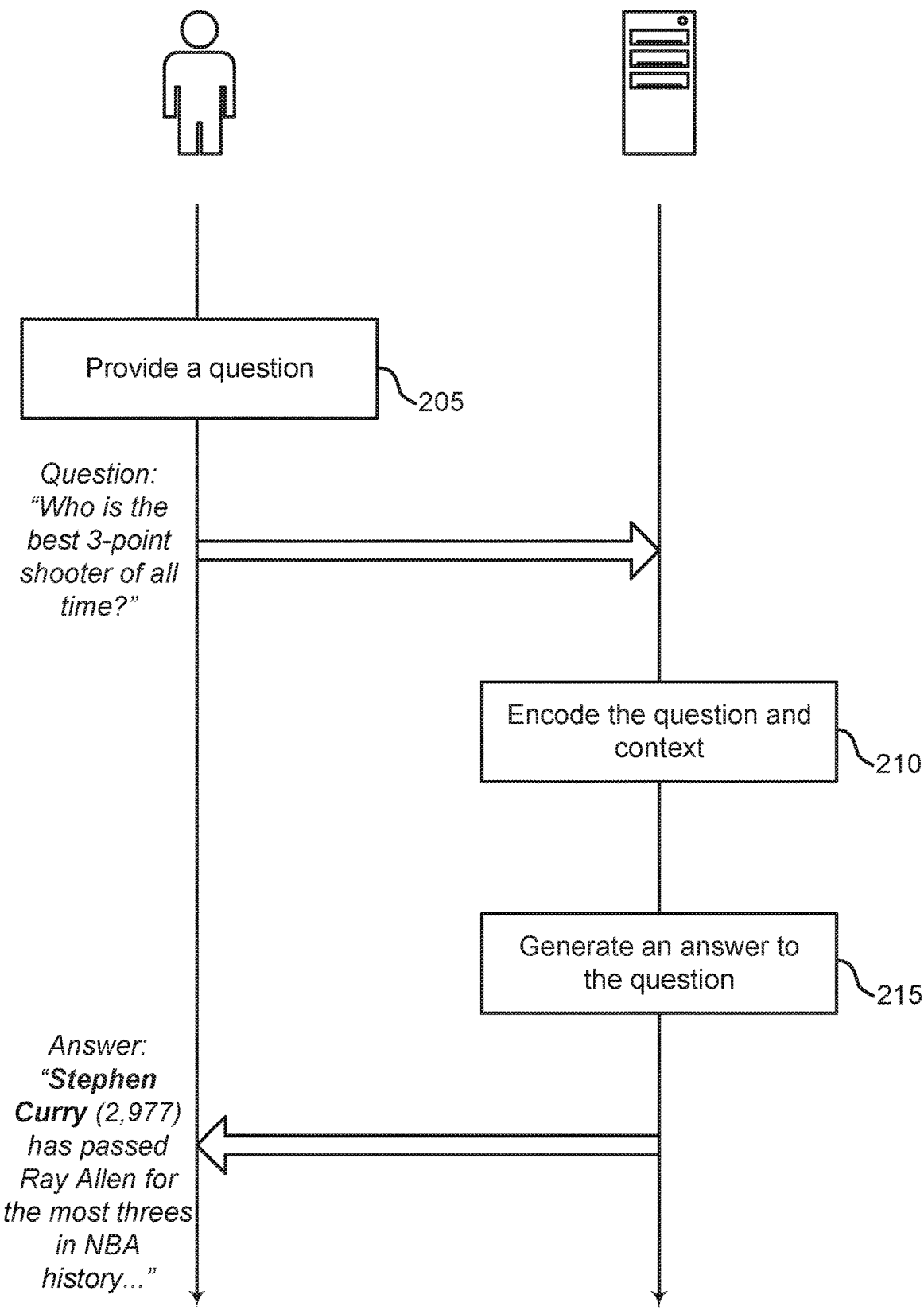
FIG. 2 shows an example of question answering according to aspects of the present disclosure.

FIG. 2 shows an example of question answering according to aspects of the present disclosure. Question answering can be performed by a typologically diverse question answering (TyDiQA) network as described below in FIG. 6. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 205, the user provides a question. In some cases, the operations of this step refer to, or may be performed by, a user as described with reference to FIG. 3. The user does not know where the answer to their question will come from. In some examples, the user asks "who is the best 3-point shooter of all time?".

At operation 210, the system encodes the question and context. In some cases, the operations of this step refer to, or may be performed by, a language processing apparatus as described with reference to FIGS. 3 and 4. In some examples, the context includes content from a Wikipedia article or document.

In some cases, the system performs minimal answer span search based on the context (e.g., Wikipedia article). That is, given the full text of an article, return one of (a) the start and end byte indices of the minimal span that completely answers the question; (b) YES or NO if the question requires a yes/no answer and the system can draw a conclusion from the passage; (c) NULL if it is not possible to produce a minimal answer for this question.

At operation 215, the system generates an answer to the question. In some cases, the operations of this step refer to, or may be performed by, a language processing apparatus as described with reference to FIGS. 3 and 4. For the above example, the answer passage is selected from a list of passages in a Wikipedia article while the minimal answer includes some span of bytes in the article (the minimal answer span is emphasized in bold). The system returns the answer "Stephen Curry (2,977) has passed Ray Allen for the most threes in NBA history (2,973) after a 5-14 shooting performance against the New York Knicks." Here, the minimal answer to the question is "Stephen Curry".

Network Architecture

In FIGS. 3-6, an apparatus and method for training a machine learning model are described. One or more embodiments of the apparatus and method include a machine learning model that is trained to perform a first NLP task and a training component configured to identify a task set including a plurality of pseudo tasks, wherein each of the plurality of pseudo tasks includes a support set corresponding to the first NLP task and a query set corresponding to a second NLP task, to update the machine learning model in an inner loop based on the support set, and to update the machine learning model in an outer loop based on the query set.

In some examples, the machine learning model comprises a multi-lingual task-oriented dialog (MTOD) network. In some examples, the machine learning model comprises a multi-lingual transformer network, an intent classifier, a conditional random field (CRF) layer, and a slot classifier. In some examples, the machine learning model comprises a typologically diverse question answering (TyDiQA) network. In some examples, the machine learning model comprises a multi-lingual transformer network and a linear layer.

Figure 3:
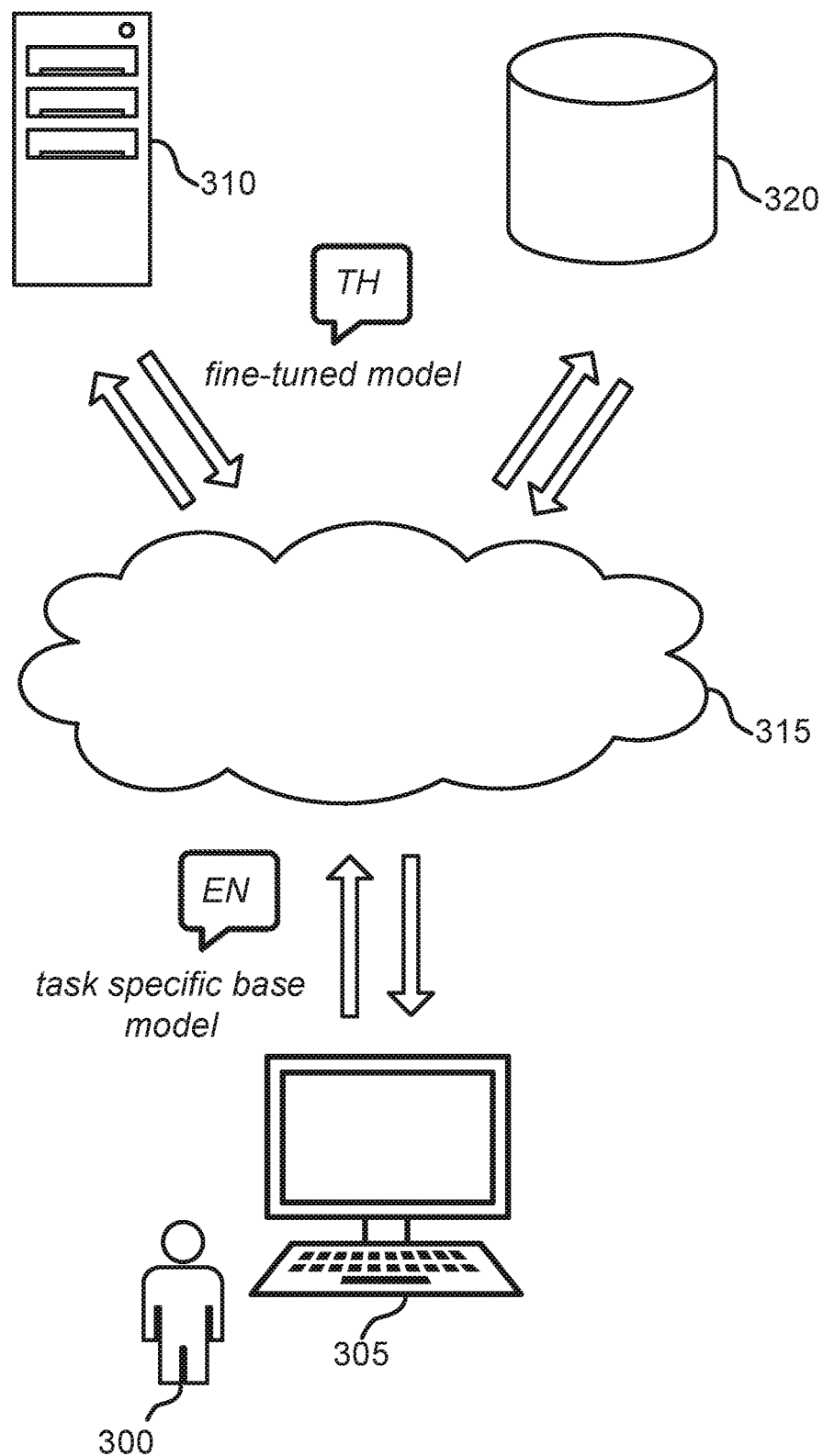
FIG. 3 shows an example of a natural language processing system according to aspects of the present disclosure.

FIG. 3 shows an example of a natural language processing system according to aspects of the present disclosure. The example shown includes user 300, user device 305, language processing apparatus 310, cloud 315, and database 320. Language processing apparatus 310 is an example of, or includes aspects of, the corresponding element described with reference to FIG. 4.

In an example of FIG. 3, user 300 provides a task-specific model to language processing apparatus 310, e.g., via user device 305 and cloud 315. In some examples, the task-specific model trained to perform a natural language processing (NLP) task in the English language can be fine-tuned to perform the task in another language, e.g., Thai. Thai is considered a low-resource language and contains typological characteristics which are different from English. In some examples, the task-specific model comprises a multi-lingual task-oriented dialog (MTOD) network. An example application of the MTOD network is described in FIG. 1. User 300 provides a phrase "set an alarm for tomorrow at 7 am" to the MTOD network. The MTOD network can generate an intent label and perform slot classification based on the user-provided phrase. The MTOD network generates "set alarm" as the intent label based on the input phrase.

Language processing apparatus 310 identifies a task set including a set of pseudo tasks. Each of the set of pseudo tasks includes a support set corresponding to a first NLP task and a query set corresponding to a second NLP task. The support set comprises high-resource language data (e.g., English) and the query set comprises low-resource language data (e.g., Thai). Language processing apparatus 310 updates a machine learning model in an inner loop based on the support set. Language processing apparatus 310 then updates the machine learning model in an outer loop based on the query set. Language processing apparatus 310 performs the second NLP task using the updated machine learning model. In some examples, the second NLP task involves generating intent label and slot classification based on another language (e.g., Thai) other than English.

In some cases, language processing apparatus 310 returns a modified machine learning model (e.g., a fine-tuned MTOD network). The fine-tuned MTOD network can perform intent and slot classification in another language (e.g., Thai, Italian, Spanish, etc.). User 300 can perform an NLP task on a target language using the fine-tuned MTOD network via user device 305 and cloud 315. The target language involves low-resource language data other than English.

User device 305 may be a personal computer, laptop computer, mainframe computer, palmtop computer, personal assistant, mobile device, or any other suitable processing apparatus. In some examples, user device 305 includes software that incorporates a language processing application (e.g., question answering). In some examples, the language processing application on user device 305 may include functions of language processing apparatus 310.

A user interface may enable user 300 to interact with user device 305. In some embodiments, the user interface may include an audio device, such as an external speaker system, an external display device such as a display screen, or an input device (e.g., remote control device interfaced with the user interface directly or through an I/O controller module). In some cases, a user interface may be a graphical user interface (GUI). In some examples, a user interface may be represented in code which is sent to the user device and rendered locally by a browser.

According to an embodiment, a training component of language processing apparatus 310 identifies a task set including a set of pseudo tasks, where each of the set of pseudo tasks includes a support set corresponding to a first natural language processing (NLP) task and a query set corresponding to a second NLP task; updates a machine learning model in an inner loop based on the support set; updates the machine learning model in an outer loop based on the query set. Language processing apparatus 310 performs the second NLP task using the updated machine learning model. The operation and application of using the machine learning model for different tasks is further described with reference to FIGS. 1 and 2.

Language processing apparatus 310 includes a computer implemented network (i.e., a machine learning model), a processor unit, a memory unit, an I/O module, and a training component. The training component is used to train a machine learning model (or a language processing network). Additionally, language processing apparatus 310 can communicate with database 320 via the cloud 315. In some cases, the architecture of the language processing network is also referred to as a network or a network model. Further detail regarding the architecture of language processing apparatus 310 is provided with reference to FIGS. 3-6. Further detail regarding training a machine learning model is provided with reference to FIGS. 7-10.

In some cases, language processing apparatus 310 is implemented on a server. A server provides one or more functions to users linked by way of one or more of the various networks. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a supercomputer, or any other suitable processing apparatus.

Cloud 315 is a computer network configured to provide on-demand availability of computer system resources, such as data storage and computing power. In some examples, the cloud 315 provides resources without active management by the user. The term cloud is sometimes used to describe data centers available to many users over the Internet. Some large cloud networks have functions distributed over multiple locations from central servers. A server is designated an edge server if it has a direct or close connection to a user. In some cases, cloud 315 is limited to a single organization. In other examples, cloud 315 is available to many organizations. In one example, cloud 315 includes a multi-layer communications network comprising multiple edge routers and core routers. In another example, cloud 315 is based on a local collection of switches in a single physical location.

Database 320 is an organized collection of data. For example, database 320 stores data in a specified format known as a schema. A database 320 may be structured as a single database, a distributed database, multiple distributed databases, or an emergency backup database. In some cases, a database controller may manage data storage and processing in database 320. In some cases, a user interacts with database controller. In other cases, database controller may operate automatically without user interaction.

Figure 4:
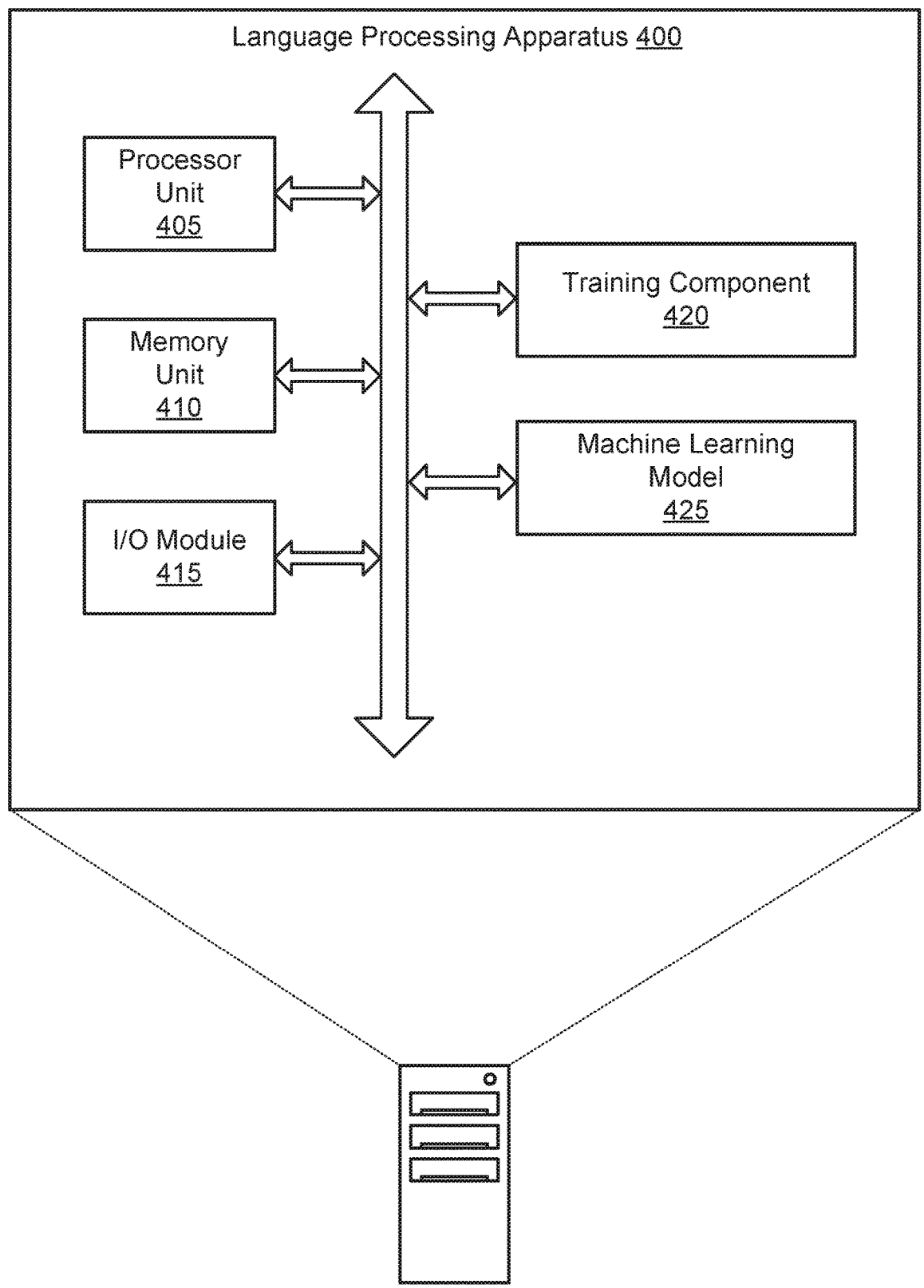
FIG. 4 shows an example of a language processing apparatus according to aspects of the present disclosure.

FIG. 4 shows an example of a language processing apparatus according to aspects of the present disclosure. The example shown includes language processing apparatus 400, which comprises processor unit 405, memory unit 410, I/O module 415, training component 420, and machine learning model 425. Language processing apparatus 400 is an example of, or includes aspects of, the corresponding element described with reference to FIG. 3.

Processor unit 405 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, processor unit 405 is configured to operate a memory array using a memory controller. In other cases, a memory controller is integrated into the processor. In some cases, processor unit 405 is configured to execute computer-readable instructions stored in a memory to perform various functions. In some embodiments, processor unit 405 includes special purpose components for modem processing, baseband processing, digital signal processing, or transmission processing.

Examples of memory unit 410 include random access memory (RAM), read-only memory (ROM), or a hard disk. Examples of memory unit 410 include solid state memory and a hard disk drive. In some examples, memory unit 410 is used to store computer-readable, computer-executable software including instructions that, when executed, cause a processor to perform various functions described herein. In some cases, memory unit 410 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within memory unit 410 store information in the form of a logical state.

I/O module 415 (e.g., an input/output interface) may include an I/O controller. An I/O controller may manage input and output signals for a device. I/O controller may also manage peripherals not integrated into a device. In some cases, an I/O controller may represent a physical connection or port to an external peripheral. In some cases, an I/O controller may utilize an operating system such as iOS®, ANDROID®, MS-DOS®, MS-WINDOWS®, OS/2®, UNIX®, LINUX®, or another known operating system. In other cases, an I/O controller may represent or interact with a modem, a keyboard, a mouse, a touchscreen, or a similar device. In some cases, an I/O controller may be implemented as part of a processor. In some cases, a user may interact with a device via I/O controller or via hardware components controlled by an IO controller.

In some examples, I/O module 415 includes a user interface. A user interface may enable a user to interact with a device. In some embodiments, the user interface may include an audio device, such as an external speaker system, an external display device such as a display screen, or an input device (e.g., remote control device interfaced with the user interface directly or through an I/O controller module). In some cases, a user interface may be a graphical user interface (GUI). In some examples, a communication interface operates at the boundary between communicating entities and the channel and may also record and process communications. Communication interface is provided herein to enable a processing system coupled to a transceiver (e.g., a transmitter and/or a receiver). In some examples, the transceiver is configured to transmit (or send) and receive signals for a communications device via an antenna.

According to some embodiments of the present disclosure, language processing apparatus 400 includes a computer implemented artificial neural network (ANN) for NLP tasks such as natural language understanding and question answering. An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. Each node and edge is associated with one or more node weights that determine how the signal is processed and transmitted.

According to some embodiments, training component 420 identifies a task set including a set of pseudo tasks, where each of the set of pseudo tasks includes a support set corresponding to a first natural language processing (NLP) task and a query set corresponding to a second NLP task. Training component 420 updates a machine learning model 425 in an inner loop based on the support set. Training component 420 updates the machine learning model 425 in an outer loop based on the query set. In some examples, training component 420 selects the query set. Training component 420 selects the support set based on the selected query set. In some examples, the support set is drawn from a first training set used for pretraining the machine learning model 425 on a first task. The query set is drawn from a second training set selected for fine-tuning the machine learning model 425 on a second task. In some examples, the support set includes high-resource language data and the query set includes low-resource language data.

In some examples, training component 420 computes a support loss for the pseudo task based on the support set. Training component 420 computes a gradient of the support loss. Training component 420 updates the parameters of the machine learning model 425 based on the gradient of the support loss.

In some examples, training component 420 computes a query loss for the pseudo task. Training component 420 sums the query loss over the set of pseudo tasks to obtain a query loss sum. Training component 420 computes a gradient of the query loss sum. Training component 420 updates the machine learning model 425 based on the gradient of the query loss sum.

In some examples, training component 420 identifies a second-phase task set including a second set of pseudo tasks, where each of the second set of pseudo tasks includes a second-phase support set and a second-phase query set. Training component 420 updates the machine learning model 425 in a second phase, where the second phase includes a second-phase inner loop based on the second-phase support set and a second-phase outer loop based on the second-phase query set. In some examples, the second-phase support set and the second-phase query set include low-resource language data from a same language.

According to some embodiments, training component 420 identifies a task set including a set of pseudo tasks, where each pseudo task of the set of pseudo tasks includes a support set and a query set. Training component 420 computes a support loss for the pseudo task based on the support set. Training component 420 updates a machine learning model 425 based on a gradient of the support loss. Training component 420 computes a query loss for the pseudo task based on the updated machine learning model 425. Training component 420 updates the machine learning model 425 based on a gradient of a sum of the query loss over the set of pseudo tasks.

According to some embodiments, machine learning model 425 performs the second NLP task. In some examples, machine learning model 425 receives a span of text. Machine learning model 425 generates an intent label for the span of text. Machine learning model 425 generates a slot classification for the span of text, where the second NLP task includes generating the intent label and the slot classification.

In some examples, machine learning model 425 receives a span of text specifying a question. Machine learning model 425 generates an answer to the question, where the second NLP task includes generating the answer to the question.

In some examples, machine learning model 425 receives a query and context text. Machine learning model 425 combines the query and the context text to obtain an input text. Machine learning model 425 generates a word embedding corresponding to each word of the input text. Machine learning model 425 transmits a probability corresponding to each word of the input text, where the probability indicates whether a corresponding word is a start or end of an answer. In some examples, the first NLP task and the second NLP task include intent detection, slot filling, question answering, or any combination thereof.

According to some embodiments, machine learning model 425 receives a span of text. Machine learning model 425 performs an NLP task on the span of text. The machine learning model 425 includes a multi-lingual task-oriented dialog (MTOD) network. In some examples, the machine learning model 425 includes a multi-lingual transformer network, an intent classifier, a conditional random field (CRF) layer, and a slot classifier. In some examples, the machine learning model 425 includes a typologically diverse question answering (TyDiQA) network. In some examples, the machine learning model 425 includes a multi-lingual transformer network and a linear layer.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

Figure 5:
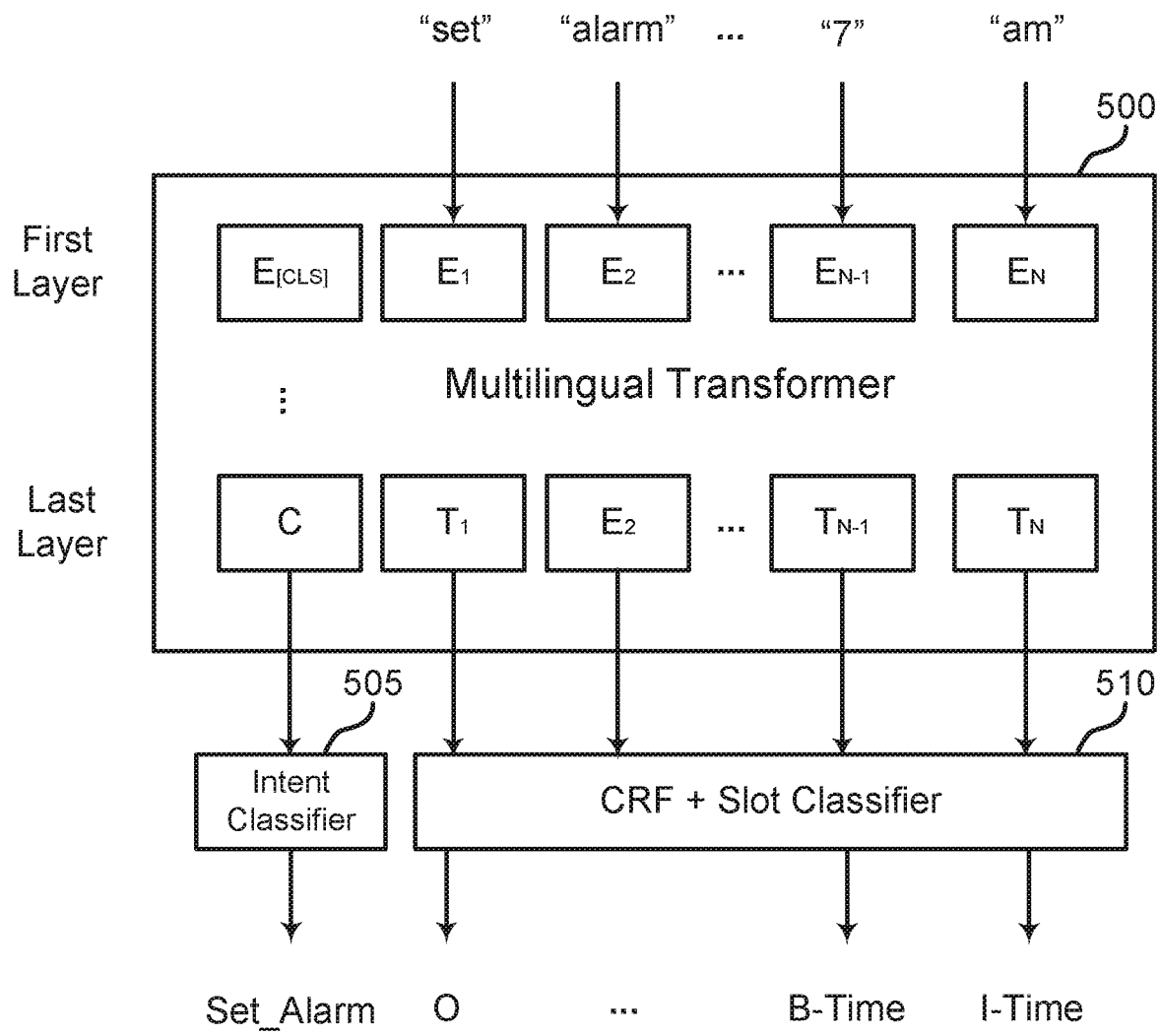
FIG. 5 shows an example of a natural language understanding network according to aspects of the present disclosure.

FIG. 5 shows an example of a natural language understanding network according to aspects of the present disclosure. The natural language understanding network shown in FIG. 5 is an example of machine learning model 425 described in FIG. 4. The example shown includes multi-lingual transformer network 500, intent classifier 505, and CRF layer and slot classifier 510. Multi-lingual transformer network 500 is an example of, or includes aspects of, the corresponding element described with reference to FIG. 6.

The machine learning model includes a multi-lingual task-oriented dialog (MTOD) network. According to an embodiment, the machine learning model is configured to model intent classification and slot filling tasks jointly. In some cases, joint modeling depends on a joint text classification and sequence labeling with feature representation using a transformer network.

According to an example in FIG. 5, an input phrase is "set alarm for tomorrow at 7 am." The input phrase is input to a pre-trained multi-lingual transformer network 500. Multi-lingual transformer network 500 initializes the word-piece embeddings layer. In some examples, the phrase "set" corresponds to $E_1$. The phrase "alarm" corresponds to $E_2$. Next, a text classifier (e.g., intent classifier 505) is added to multi-lingual transformer network 500 to predict the intent from the [CLS] token representation. Intent classifier 505 predicts the intent based on the input phrase. The predicted intent of the input phrase is "set alarm".

In some examples, multi-lingual transformer network 500 comprises Bidirectional Encoder Representations from Transformers (BERT). Given a sequence of tokens $t_1, t_2, \ldots, t_n$, BERT computes a sequence of representations $h=(h_1, h_2, \ldots h_n)$ to capture salient contextual information for each token. For sequence labeling tasks, for every token in a sequence, the corresponding final hidden state can be used for classifying such token with respect to the target categories. Multi-lingual transformer network 500 uses both the token-level and sentence-level features to perform a joint classification of the sentence and token categories. In an embodiment, to classify a sequence of tokens with intent c and slots, each token is passed through BERT, which generates a set of representations $h=(h_0, h_1, h_2, \ldots h_n)$. $h_0$ is the final hidden state of [CLS] token, while $h_j$ is the final hidden state of token $t_j$, for $j=1, \ldots, n$. Multi-lingual transformer network 500 is trained to generate sentence-level category probabilities and token-level categories probabilities for token $t_j$.

Additionally, a sequence labeling layer (i.e., a linear layer) includes CRF layer and slot classifier 510, which is configured to predict the slot spans in BIO annotation (e.g., B-Time, I-Time, O). B-Time stands for beginning of time. I-Time stands for inside of inside of time. O stands for outside. CRF layer and slot classifier 510 assigns each of the tokens with one of the BIO annotations (e.g., B-Time, I-Time, O). The parameters are optimized using the sum of intent and CRF based slot losses. An application of using multi-lingual transformer network 500 is described in FIG. 1.

Figure 6:
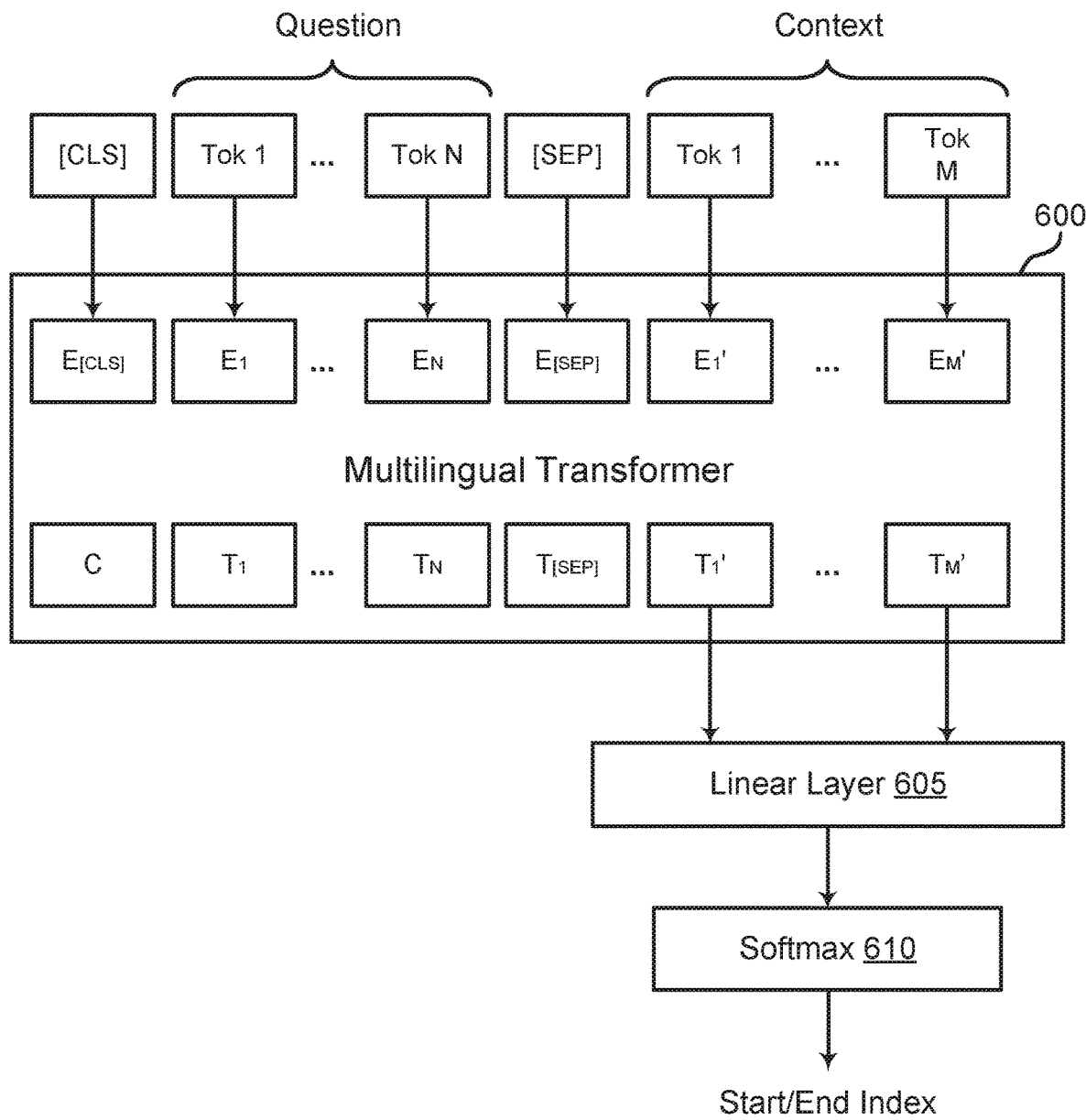
FIG. 6 shows an example of a question answering network according to aspects of the present disclosure.

FIG. 6 shows an example of a question answering network according to aspects of the present disclosure. The question answering network shown in FIG. 6 is an example of machine learning model 425 described in FIG. 4. The example shown includes multi-lingual transformer network 600, linear layer 605, and softmax 610. Multi-lingual transformer network 600 is an example of, or includes aspects of, the corresponding element described with reference to FIG. 5.

According to some embodiments, the input question (after prepending the input question with a [CLS] token) and the context are concatenated as a single packed sequence separated by a [SEP] token. That is, input to multi-lingual transformer network 600 includes a [CLS] token, tokens corresponding to a question, a [SEP] token, and tokens corresponding to context, in this order. Next, the embeddings of the context are input to linear layer 605. As illustrated in FIG. 6, tokens $T_1', T_2', \ldots T_M'$ are input to linear layer 605.

Output from linear layer 605 is input to softmax 610 to compute the probability that each token is the START or END of the answer (e.g., START/END index). A softmax function is used as the activation function of a neural network to normalize the output of the network to a probability distribution over predicted output classes. After applying the softmax function, each component of the feature map is in the interval (0, 1) and the components add up to one. These values are interpreted as probabilities.

The whole architecture is fine-tuned by optimizing for the joint loss over the START and END predictions. Any START and END positions that are outside of the scope of the context are truncated because of transformer-based embeddings length and are ignored during training.

In some examples, multi-lingual transformer network 600 is trained to generate minimal answer span. Given the full text of an article, multi-lingual transformer network 600 returns one of (a) the start and end byte indices of the minimal span that completely answers the question; (b) YES or NO if the question requires a yes/no answer and a conclusion from the passage can be drawn; (c) NULL if it is not possible to produce a minimal answer for this question.

An application of using multi-lingual transformer network 600 in the context of question answering is described in FIG. 2.

Training and Evaluation

In FIGS. 7-10, a method, apparatus, and non-transitory computer readable medium for training a machine learning model are described. One or more embodiments of the method, apparatus, and non-transitory computer readable medium include identifying a task set including a plurality of pseudo tasks, wherein each of the plurality of pseudo tasks includes a support set corresponding to a first natural language processing (NLP) task and a query set corresponding to a second NLP task; updating a machine learning model in an inner loop based on the support set; updating the machine learning model in an outer loop based on the query set; and performing the second NLP task using the machine learning model.

Some examples of the method, apparatus, and non-transitory computer readable medium further include selecting the query set. Some examples further include selecting the support set based on the selected query set.

In some examples, the support set is drawn from a first training set used for pretraining the machine learning model on a first task. In some examples, the query set is drawn from a second training set selected for fine-tuning the machine learning model on a second task. In some examples, the support set comprises high-resource language data and the query set comprises low-resource language data.

Some examples of the method, apparatus, and non-transitory computer readable medium further include computing a support loss for the pseudo task based on the support set. Some examples further include computing a gradient of the support loss. Some examples further include updating parameters of the machine learning model based on the gradient of the support loss.

Some examples of the method, apparatus, and non-transitory computer readable medium further include computing a query loss for the pseudo task. Some examples further include summing the query loss over the plurality of pseudo tasks to obtain a query loss sum. Some examples further include computing a gradient of the query loss sum. Some examples further include updating the machine learning model based on the gradient of the query loss sum.

Some examples of the method, apparatus, and non-transitory computer readable medium further include identifying a second-phase task set including a second plurality of pseudo tasks, wherein each of the second plurality of pseudo tasks includes a second-phase support set and a second-phase query set. Some examples further include updating the machine learning model in a second phase, wherein the second phase comprises a second-phase inner loop based on the second-phase support set and a second-phase outer loop based on the second-phase query set. In some examples, the second-phase support set and the second-phase query set comprise low-resource language data from a same language.

Some examples of the method, apparatus, and non-transitory computer readable medium further include receiving a span of text. Some examples further include generating an intent label for the span of text using the machine learning model. Some examples further include generating a slot classification for the span of text using the machine learning model, wherein the second NLP task comprises generating the intent label and the slot classification.

Some examples of the method, apparatus, and non-transitory computer readable medium further include receiving a span of text specifying a question. Some examples further include generating an answer to the question using the machine learning model, wherein the second NLP task comprises generating the answer to the question.

Some examples of the method, apparatus, and non-transitory computer readable medium further include receiving a query and context text. Some examples further include combining the query and the context text to obtain an input text. Some examples further include generating a word embedding corresponding to each word of the input text. Some examples further include transmitting a probability corresponding to each word of the input text, wherein the probability indicates whether a corresponding word is a start or end of an answer. In some examples, the first NLP task and the second NLP task comprise intent detection, slot filling, question answering, or any combination thereof.

A method, apparatus, and non-transitory computer readable medium for training a machine learning model are described. One or more embodiments of the method, apparatus, and non-transitory computer readable medium include identifying a task set including a plurality of pseudo tasks, wherein each pseudo task of the plurality of pseudo tasks includes a support set and a query set; computing a support loss for the pseudo task based on the support set; updating a machine learning model based on a gradient of the support loss; computing a query loss for the pseudo task based on the updated machine learning model; and updating the machine learning model based on a gradient of a sum of the query loss over the plurality of pseudo tasks.

Some examples of the method, apparatus, and non-transitory computer readable medium further include identifying a second-phase task set including a second plurality of pseudo tasks, wherein each of the second plurality of pseudo tasks includes a second-phase support set and a second-phase query set. Some examples further include updating the machine learning model in a second phase, wherein the second phase comprises a second-phase inner loop based on the second-phase support set and a second-phase outer loop based on the second-phase query set.

Some examples of the method, apparatus, and non-transitory computer readable medium further include receiving a span of text. Some examples further include performing a NLP task on the span of text using the machine learning model.

Figure 7:
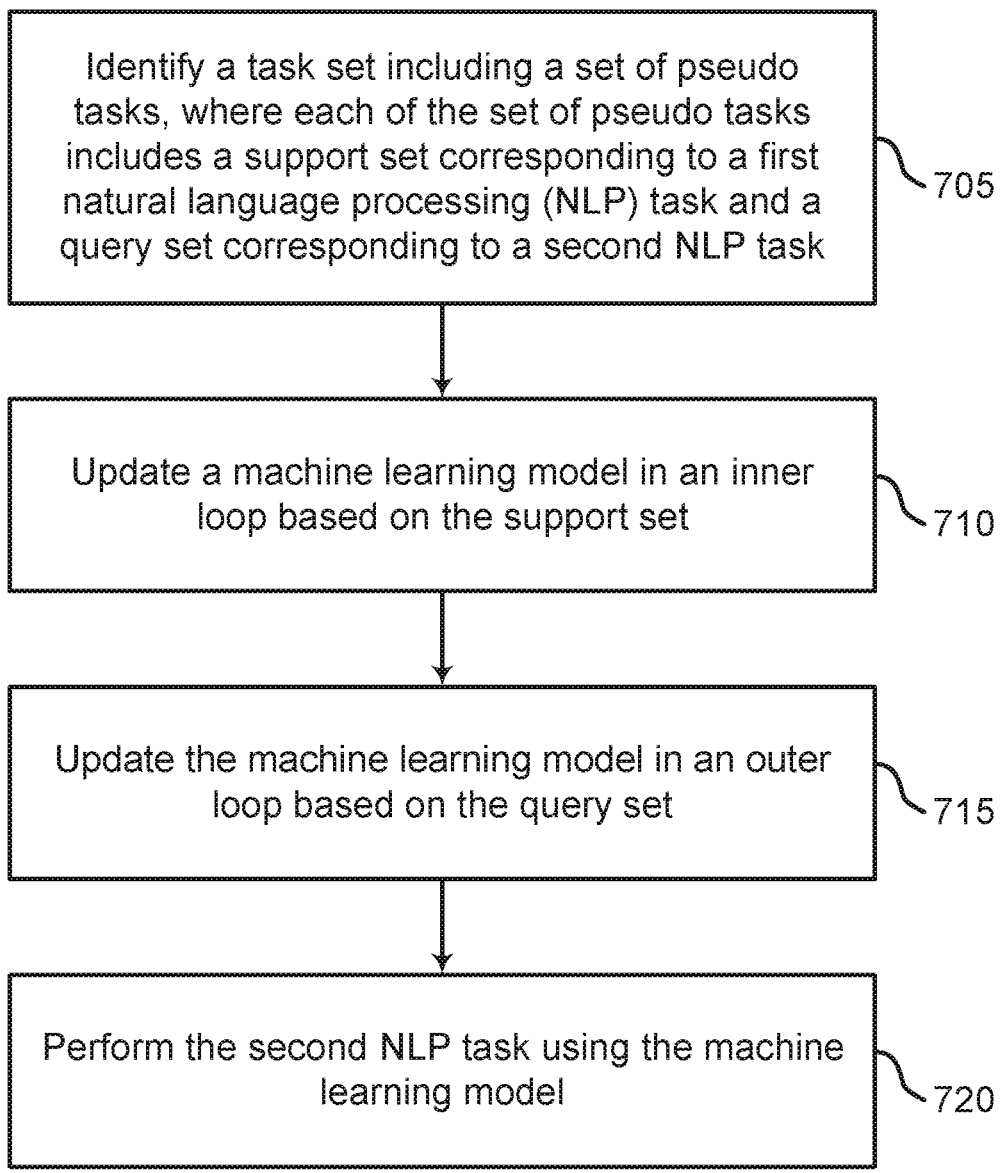
FIGS. 7 and 8 show examples of training a machine learning model according to aspects of the present disclosure.

FIG. 7 shows an example of training a machine learning model according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Supervised learning is one of three basic machine learning paradigms, alongside unsupervised learning and reinforcement learning. Supervised learning is a machine learning technique based on learning a function that maps an input to an output based on example input-output pairs. Supervised learning generates a function for predicting labeled data based on labeled training data consisting of a set of training examples. In some cases, each example is a pair consisting of an input object (typically a vector) and a desired output value (i.e., a single value, or an output vector). A supervised learning algorithm analyzes the training data and produces the inferred function, which can be used for mapping new examples. In some cases, the learning results in a function that correctly determines the class labels for unseen instances. In other words, the learning algorithm generalizes from the training data to unseen examples.

Accordingly, during the training process, the parameters and weights of the machine learning model are adjusted to increase the accuracy of the result (i.e., by minimizing a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

The term loss function refers to a function that impacts how a machine learning model is trained in a supervised learning model. Specifically, during each training iteration, the output of the model is compared to the known annotation information in the training data. The loss function provides a value for how close the predicted annotation data is to the actual annotation data. After computing the loss function, the parameters of the model are updated accordingly and a new set of predictions are made during the next iteration.

At operation 705, the system identifies a task set including a set of pseudo tasks, where each of the set of pseudo tasks includes a support set corresponding to a first natural language processing (NLP) task and a query set corresponding to a second NLP task. In some cases, the operations of this step refer to, or may be performed by, a training component as described with reference to FIG. 4.

In some cases, meta-learning is distinguished from fine-tuning in that the former seeks an initialization point that is maximally useful to multiple downstream learning tasks, while the latter seeks to directly optimize a downstream 'child' task from the initialization point of a 'parent' task. To apply meta-learning to data scenarios that more closely fit fine-tuning, multiple "pseudo tasks" are constructed by sub-sampling from parent and child task datasets. A pseudo task is defined as a tuple T=(S, Q), where each of S and Q are labeled samples. In the inner loop of meta-learning, the loss on Q from a model trained on S is used to adapt the initialization point. Q and S are referred to as the query and support in meta-learning. Pseudo-tasks are constructed in such a way as to make them balanced and non-overlapping. Constructing MTOD pseudo-task and question answering (QA) pseudo-task is described in detail below.

MTOD labeled data consists of a sentence from a dialogue along with a sentence-level intent label and subsequence slot labels. A number of task sets $\mathbb{T}$ are drawn from the available data; each T=(S, Q)∈ $\mathbb{T}$ consists of k intent and slot-labeled items per intent class in S and q items per class in Q. In some cases, the same number of items per class per task are arranged in each of the support and the query sets. Additionally, the same task splits are used for slot prediction. Task batches are sampled randomly from $\mathbb{T}$ during meta-training and meta-adaptation.

QA is not considered a standard classification task with fixed classes. QA is not directly amenable to class distribution balancing across pseudo-task query and support sets. The following procedure is used to construct pseudo-tasks for QA from the (i.e., question, context, answer) span triplet data. A task T=(S, Q), is drawn by first randomly drawing q triplets, forming Q. The k/q most similar triplets to t are drawn from the remaining available data for each triplet t in Q, thus forming S. k is constrained to be a multiple of q. Similarity is calculated as $\cos(f(t_1), f(t_2))$ for two triplets $t_1$, $t_2$, where $f(\bullet)$ is a representation of the concatenation of the triplet elements delimited by a space. In some cases, a cross-lingual extension to SBERT's pre-trained model is used.

The conventional MAML technique samples a task set $\mathbb{T}$ from a single distribution $\mathcal{D}$ in each iteration. Additionally, the support and query sets in a single task T are drawn from a common space. In some cases, distributions $\mathcal{D}_{meta\text{-}train}$ and $\mathcal{D}_{meta\text{-}adapt}$ are different, which correspond to the two levels of adaptation, respectively.

Data for the support set of tasks in $\mathcal{D}_{meta\text{-}train}$ is drawn from task data in the high-resource base language to enable cross-lingual transfer. For example, English is considered a high-resource language and used as base language. In some examples, sampling is performed from task data in the language to be evaluated for the query set in $\mathcal{D}_{meta\text{-}train}$ and for support and query sets in $\mathcal{D}_{meta\text{-}adapt}$.

At operation 710, the system updates a machine learning model in an inner loop based on the support set. In some cases, the operations of this step refer to, or may be performed by, a training component as described with reference to FIG. 4. In some examples, the inner loop refers to lines 6-8 of algorithm 1000 (see FIG. 10) but then it is repeated for each pseudo-task iterated through in line 4 and for each the theta parameters are reinitialized in line 6.

At operation 715, the system updates the machine learning model in an outer loop based on the query set. In some cases, the operations of this step refer to, or may be performed by, a training component as described with reference to FIG. 4. In some examples, lines 2-5 and lines 10-12 of algorithm 1000 in FIG. 10 are the outer loop. Line 10 is a preparation for the outer loop (precomputation of loss with any backward pass at this point). In line 6 of algorithm 1000, t is the number of training steps or the number of gradient updates. Hyperparameters can be fixed or tuned independently. Detail regarding the language-agnostic meta-learning algorithm applied to meta-train and meta-adapt will be described in greater detail in FIG. 10.

At operation 720, the system performs the second NLP task using the machine learning model. In some cases, the operations of this step refer to, or may be performed by, a machine learning model as described with reference to FIG. 4. In some examples, the second NLP task includes generating intent label and slot classification based on a low-resource language such as Thai.

Figure 8:
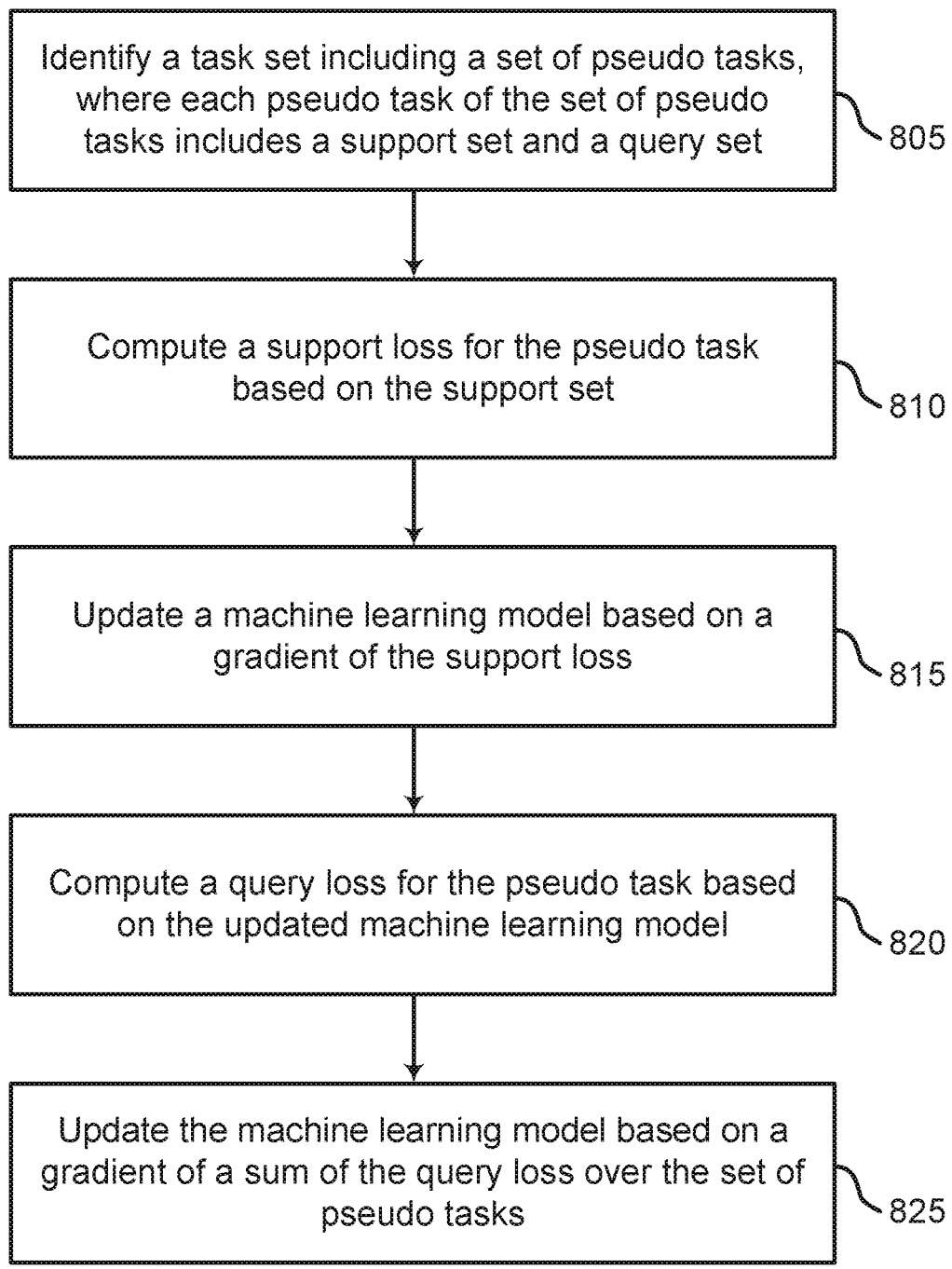

FIG. 8 shows an example of training a machine learning model according to aspects of the present disclosure. FIG. 8 illustrates training machine learning model 425 following a nested loop algorithm (i.e., inner loop and outer loop mentioned above in FIG. 7). In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 805, the system identifies a task set including a set of pseudo tasks, where each pseudo task of the set of pseudo tasks includes a support set and a query set. In some cases, the operations of this step refer to, or may be performed by, a training component as described with reference to FIG. 4. According to an embodiment, referring to algorithm 1000 in FIG. 10, the training component samples batch of tasks $\mathbb{T}=\{T_1, T_2, \ldots, T_b\}\sim\mathcal{D}$. A pseudo-task is defined as T=(S, Q), where each of S and Q includes labeled samples. Q and S are referred to as the query set and support set, respectively. In some examples, $T_j=(S_j, Q_j)$ is a pseudo task of the set of pseudo tasks. $S_j$ is a support set while $Q_j$ is a query set.

For dialogue intent prediction, the multilingual task-oriented dialogue (MTOD) dataset is used. MTOD covers 3 languages (English, Spanish, and Thai), 3 domains (alarm, reminder, and weather), 12 intent types, and 11 slot types. The machine learning model is trained with the English training data (Train). But for the other languages, the provided development sets (Dev) are used to analyze few-shot transfer. Evaluation is conducted on the provided test sets (e.g., in-house dataset of 7 languages).

For QA, Typologically Diverse QA (TyDiQA-GoldP) dataset is used. TyDiQA is a typologically diverse question answering dataset covering 11 languages. In some examples, questions that don't have an answer are discarded and use only the gold passage as context, keeping only the short answer and its spans. The questions are written without looking at the answers and without machine translation. As with MTOD, the English training data is used as Train. Since development sets are not specified for MTOD, the training component reserves 10% of the training data in each of the other languages as Dev.

At operation 810, the system computes a support loss for the pseudo task based on the support set. In some cases, the operations of this step refer to, or may be performed by, a training component as described with reference to FIG. 4. Referring to FIG. 10, a support loss refers to $\mathcal{L}_{T_j}^{S_j}(B_{\theta_j})$. A gradient of the support loss is $\nabla_{\theta_j}\mathcal{L}_{T_j}^{S_j}(B_{\theta_j})$.

At operation 815, the system updates a machine learning model based on a gradient of the support loss. In some cases, the operations of this step refer to, or may be performed by, a training component as described with reference to FIG. 4. Referring to FIG. 10, the training component evaluates $\partial B_{\theta_j}/\partial\theta_j=\nabla_{\theta_j}\mathcal{L}_{T_j}^{S_j}(B_{\theta_j})$. In some cases, updating a machine learning may be referred to as updating the value of θ.

At operation 820, the system computes a query loss for the pseudo task based on the updated machine learning model. In some cases, the operations of this step refer to, or may be performed by, a training component as described with reference to FIG. 4. Referring to FIG. 10, a query loss is defined to be $\mathcal{L}_{T_j}^{Q_j}(B_{\theta_j})$. The training component evaluates query loss $\mathcal{L}_{T_j}^{Q_j}(B_{\theta_j})$.

At operation 825, the system updates the machine learning model based on a gradient of a sum of the query loss over the set of pseudo tasks. In some cases, the operations of this step refer to, or may be performed by, a training component as described with reference to FIG. 4. Referring to FIG. 10, a gradient of a sum of the query loss over the set of pseudo tasks is referred to as $\theta-\beta\nabla_\theta\Sigma_{j=1}^{b}\mathcal{L}_{T_j}^{Q_j}(B_{\theta_j})$.

Figure 9:
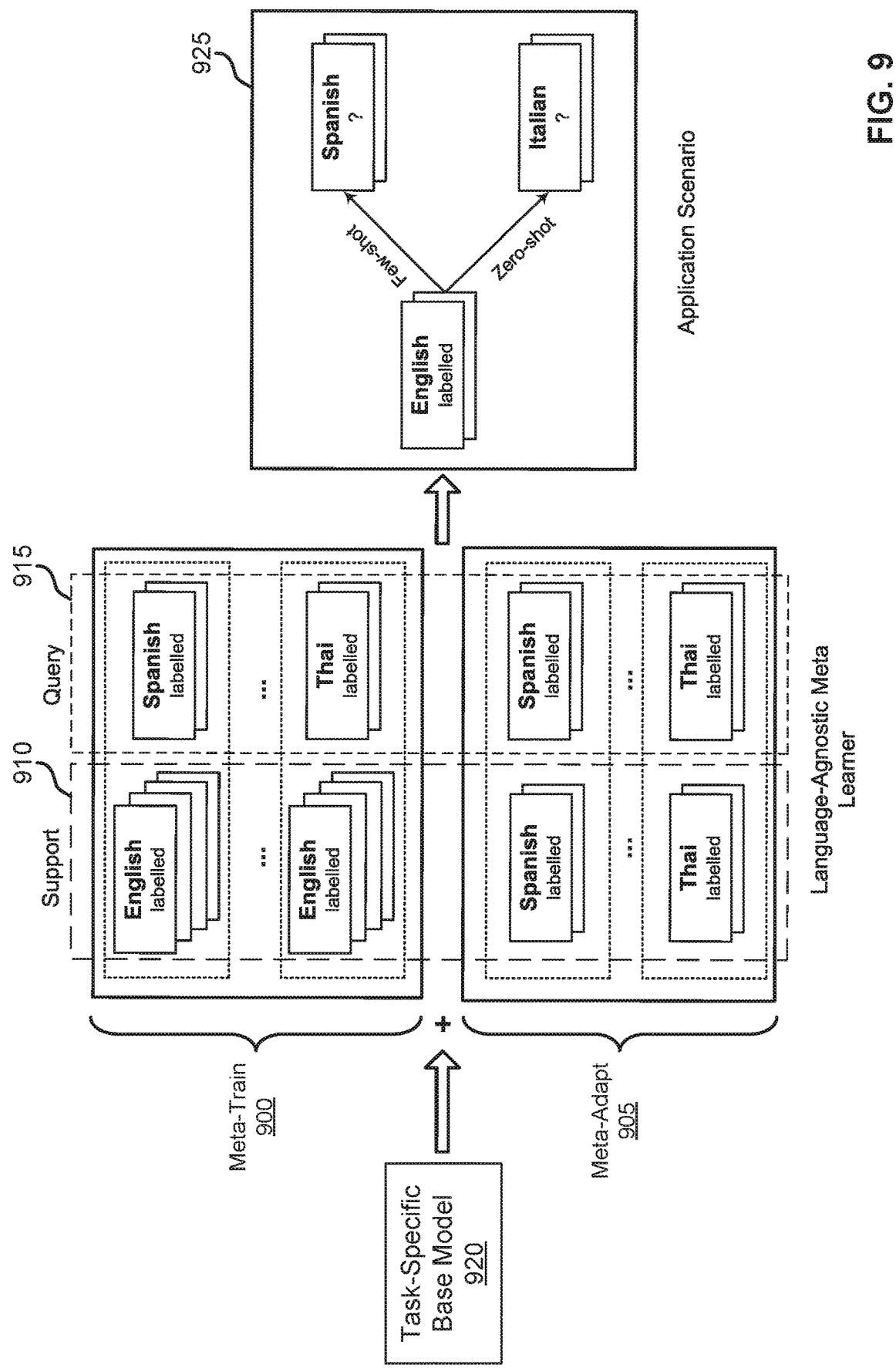
FIG. 9 shows an example of meta-train and meta-adapt according to aspects of the present disclosure.

FIG. 9 shows an example of meta-train 900 and meta-adapt 905 according to aspects of the present disclosure. Training component 420 of FIG. 4 trains a task specific base model (e.g., MTOD, TyDiQA) following meta-train 900 and meta-adapt 905. The example shown includes meta-train 900, meta-adapt 905, support set 910, query set 915, task-specific base model 920, and application 925. FIG. 9 illustrates a process of training machine learning model 425 of FIG. 4 and a process of using the trained machined learning model 425 in application scenarios. In some cases, meta-train 900 and meta-adapt 905 may be referred to as meta-training and meta-adaptation, respectively.

In some examples, English is used as the source language and Spanish as the target language. The meta-train 900 stage transfers from the source to the target languages, while the meta-adaptation 905 further adapts machine learning model 425 to the target language. The application is few-shot if the test language is seen in any stage of X-METRA-ADA; or zeroshot if the test language is unseen.

According to an embodiment, language processing apparatus 400 of FIG. 4 is configured for optimization-based meta-learning on top of pre-trained models with two levels of adaptation to reduce the risk of over-fitting to the target language. The two levels of adaptation comprise meta-training 900 from the source language to the target language(s) and meta-adaptation 905 on the same target language(s) for language-specific adaptation.

In some examples, optimization-based meta-learning on pre-trained models can be applied to cross-lingual downstream tasks, MTOD and TyDiQA. The base architecture for MTOD is described in FIG. 5. The base architecture for TyDiQA is described in FIG. 6. MTOD and TyDiQA are incorporated into meta-learning framework. Applying meta-learning to a task depends on construction of multiple "pseudo-tasks", which are instantiated as pairs of datasets.

FIG. 10 shows an example of an algorithm for training a machine learning model according to aspects of the present disclosure. FIG. 10 shows algorithm 1000 comprising a language-agnostic meta-learning algorithm. The meta-learning algorithm 1000 relates to an adaptation of an optimization-based meta-learning method for cross-lingual transfer learning implemented in two stages. The two stages include a meta-train stage and a meta-adapt stage. Algorithm 1000 is applied to meta-train and meta-adapt stage separately. That is, meta-train phase runs algorithm 1000 to train machine learning model 425. Then meta-adapt phase runs algorithm 1000 again to train machine learning model 425 with different hyperparameters.

According to an embodiment, each of the meta-train and meta-adapt stage shown in FIG. 9 runs the procedure in algorithm 1000. Language processing apparatus 400 of FIG. 4 starts by sampling a batch of tasks from distribution $\mathcal{D}$. For every task $T_j=(S_j, Q_j)$, $\theta_j$ is updated over n steps using batches drawn from $S_j$. The gradients are computed with respect to the loss of $\theta_j$ on $Q_j$ at the end of the inner loop. Pre-computed gradients are summed up and updated as θ at the end of tasks of each batch, thus completing one outer loop. The difference between meta-train and meta-adapt stages comes down to the parameters and hyperparameters passed into algorithm 1000.

Algorithm 1000 includes a function referred to as X-METRA-ADA. The function uses a task set distribution $\mathcal{D}$, pre-trained learner B with parameters $\theta_B$, meta-learner M with parameters (θ, α, β, n). At line 1, algorithm 1000 initializes θ as $\theta_B$. At line 2, while not done algorithm 1000 is executed to run lines 3 to 12. At line 3, algorithm 1000 samples a batch of tasks $\mathbb{T}=\{T_1, T_2, \ldots, T_b\}\sim\mathcal{D}$. $\mathbb{T}$ is also referred to as a task set comprising a set of pseudo tasks. At line 4, for all $T_j=(S_j, Q_j)$ in $\mathbb{T}$, algorithm 1000 executes lines 5 to 10. $T_j$ is a pseudo task. $S_j$ is a support set. $Q_j$ is a query set. At line 5, algorithm 1000 initializes $\theta_j$ as θ. At line 6, for t=1 . . . n, algorithm 1000 executes lines 7 to 8. At line 7, algorithm 1000 evaluates a gradient of a support loss $\partial B_{\theta_j}/\partial\theta_j$ as $\nabla_{\theta_j}\mathcal{L}_{T_j}^{S_j}(B_{\theta_j})$. Here, $\mathcal{L}_{T_j}^{S_j}(B_{\theta_j})$ is a support loss. $\partial B_{\theta_j}/\partial\theta_j$ is a gradient of the support loss. At line 8, algorithm 1000 updates the value of $\theta_j$ to be $\theta_j-\alpha\partial B_{\theta_j}/\partial\theta_j$. At line 10, algorithm 1000 evaluates a query loss $\mathcal{L}_{T_j}^{Q_j}(B_{\theta_j})$ and saves the query loss for outer loop. At line 12, algorithm 1000 updates the value of θ to be $\theta-\Delta\nabla_\theta\Sigma_{j=1}^{b}\mathcal{L}_{T_j}^{Q_j}(B_{\theta_j})$. Here, $\nabla_\theta\Sigma_{j=1}^{b}\mathcal{L}_{T_j}^{Q_j}(B_{\theta_j})$ is a gradient of a sum of the query loss over the set of pseudo tasks.

The inner loop is the loop in lines 6-8 of algorithm 1000 but then it is repeated for each pseudo-task iterated through in line 4 and for each the theta parameters are reinitialized in line 6. Line 10 is a preparation for the outer loop (precomputation of loss with any backward pass at this point). In line 6 of algorithm 1000, t is the number of training steps or the number of gradient updates. In some examples, the value of t does not depend on the value of alpha in line 8. Those hyperparameters can be fixed or tuned independently.

In line 7 of algorithm 1000, the meta-learner M is the algorithm, or the abstraction used like with the fixed hyperparameters alpha, beta, and n (i.e., $\alpha$, $\beta$, and n are not changed). In some cases, algorithm 1000 tunes the parameters of the downstream model which is the pre-trained learner B. That is, algorithm 1000 is excluded from tuning the meta-learning mechanism. Note meta-learner hyperparameters include alpha, beta, and n. Theta is the outcome of the training/tuning, not a pre-requisite.

For the meta-train stage, task sets are sampled from $\mathcal{D}_{meta-train}$, which uses high-resource (e.g., English) data in support sets and low-resource data in the query sets. The input model $\theta_B$ is a pretrained multi-lingual downstream base model. Additionally, hyperparameters n=5, $\alpha$=1e−3 and $\beta$=1e−2 are used for MTOD and $\alpha$=$\beta$=3e−5 are used for QA.

The meta-adapt stage ensures that machine learning model 425 is configured to learn from examples within the target language under a low-resource regime. Task sets are sampled from $\mathcal{D}_{meta-adapt}$, which uses low-resource data in both support and query sets. The input model is the optimization result from meta-train. Additionally, hyperparameters n=5, $\alpha$=1e−3 and $\beta$=1e−2 are selected for MTOD and $\alpha$=$\beta$=3e−5 are selected for QA.

Performance of apparatus, systems and methods of the present disclosure have been evaluated, and results indicate embodiments of the present disclosure have obtained increased performance over existing technology. Example experiments demonstrate that the language processing apparatus outperforms conventional systems.

To evaluate methods of the present disclosure to few-shot transfer learning via meta-learning, experiments are conducted based on both internal and external baselines. The internal baselines ablate the effect of X-METRA-ADA algorithm (i.e., algorithm 1000 described in FIG. 10) vs. conventional fine-tuning from a model trained on a high-resource language by keeping the data sets used for training constant.

PRE is an initial model fine-tuned on the Train split of English only and then evaluated on new languages with no further tuning or adaptation. PRE baseline has exposure to English task data only.

METRA includes the PRE model as $\theta_B$ for meta-train, the Train split from English to form support sets in $\mathcal{D}_{meta-train}$, and the Dev split of the target language to form query sets in $\mathcal{D}_{meta-train}$.

X-METRA-ADA includes PRE model as $\theta_B$ for meta-train, the Train split from English to form support sets in $\mathcal{D}_{meta-train}$. For MTOD, use 75% of the Dev split of the target language to form query sets in $\mathcal{D}_{meta-train}$. Use the remaining 25% of the Dev split of the target language for both the support and query sets of $\mathcal{D}_{meta-adapt}$. For QA, use ratios of 60% for $\mathcal{D}_{meta-train}$ and 40% for $\mathcal{D}_{meta-adapt}$.

These models are ultimately fine-tuned versions of BERT and all have access to the same task training data relevant for their variant. That is, X-METRA-ADA and PRE both see the same English Train data and MONO, FT, and X-METRA-ADA see the same target language Dev data.

According to an embodiment, the machine learning model 425 (see FIG. 4) comprises M-BERT (bert-base-multilingual-cased) with 12 layers as initial models for MTOD and TyDiQA-GoldP for evaluation. xlm-r-distilroberta-base-paraphrase-v1 model is used to compute similarities when constructing the QA meta-dataset. X-METRA-ADA uses learn2learn for differentiation and update rules in the inner loop. X-METRA-ADA uses the first-order approximation option in learn2learn for updating the outer loop. For each model, some examples run for 3 to 4 different random initializations (for some experiments like PRE for TyDiQA-GoldP, use only 2 seeds respectively) and the average and standard deviation of the best model for the few-shot language for each run is recorded. Some examples use training loss convergence as criteria for stopping. In some cases, the Dev set is chosen to simulate a low-resource setup. In some examples, the M-BERT model is pretrained on masked labeled modeling and next sentence prediction (NSP). The M-BERT model is then fine-tuned for down-stream tasks (e.g., different modes of fine-tuning may include fine-tuning on English only, fine-tuning on a target language on top of the pretrained M-BERT model as described below).

All experiments are run using Pytorch version 1.6.0, 1 GeForce RTX P8 GPU of 11 MB of memory CUDA version 10.1. The runtime depends on the size of the dev data but most MTOD models take around 3 hours to converge and TyDiQA models take a maximum of 10 hours training (including evaluation at checkpoints).

X-METRA-ADA of the present disclosure outperforms previous external baselines and fine-tuning models for both Spanish and Thai. X-METRA-ADA has the best overall performance with an average cross-lingual cross-task increase of 3.2% over the FT baseline, 6.9% over FT w/EN, and 12.6% over MONO. X-METRA-ADA may work better for languages like Thai compared to Spanish as Thai is a relatively more low-resource language. Fine-tuning on English only learns an unsuitable initialization, impeding its generalization to other languages. Fine-tuning on small amounts of the Dev data does not help the model generalize to new languages. X-METRA-ADA learns a more stable and successful adaptation to that language even on top of a model fine-tuned on English with less over-fitting.

Some example experiments compare X-METRA-ADA, X-METRA (i.e., meta-training but without meta-adaptation stage), and fine-tuning, both with English and with target language data only, for Spanish and Thai intent detection in MTOD. In some cases, naive fine-tuning, X-METRA, and X-METRA-ADA start from the same checkpoint (i.e., fine-tuned on English). All model variants are sampled from the same data.

Some example experiments perform a k-shot analysis by treating the number of instances seen per class (i.e., "shots") as a hyper-parameter to determine at which level few-shot meta-learning starts to outperform the fine-tuning and monolingual baselines. The results indicate even one shot for X-METRA-ADA is better than fine-tuning on intent classification. k=q=9 shot and k=q=6 shot are at the same level of stability with slightly better results for 6 shot. In some examples, it starts approaching the same level of performance as 3 shot upon convergence. Some example experiments show an analysis over both k and q shots for TyDiQA-GoldP. In some cases, increasing q helps more than increasing k.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method for training a machine learning model, comprising:
    identifying a task set including a plurality of pseudo tasks, wherein each of the plurality of pseudo tasks includes a support set corresponding to a first natural language processing (NLP) task in a first language and a query set corresponding to a second NLP task in a second language, wherein the first language comprises a high-resource language and the second language comprises a low-resource language that is typologically different from the first language;
    in each of a plurality of iterations of an inner loop, updating parameters of a machine learning model based on the support set to obtain an inner-loop parameter, wherein the updating comprises:
        computing a support loss for the pseudo task based on the support set;
        computing a gradient of the support loss; and
        updating the parameters of the machine learning model based on the gradient of the support loss,
    in each of a plurality of iterations of an outer loop, updating the parameters of the machine learning model based on the query set to obtain an outer-loop parameter, wherein the updating comprises:
        computing a query loss for the pseudo task;
        summing the query loss over the plurality of pseudo tasks to obtain a query loss sum;
        computing a gradient of the query loss sum; and
        updating the machine learning model based on the gradient of the query loss sum,
    wherein the inner loop is nested within each of the plurality of iterations of the outer loop, and the outer-loop parameter corresponding to each iteration of the plurality of iterations of the outer loop is based on a different inner-loop parameter corresponding to an outcome of the inner loop nested within the iteration of the outer loop; and
    performing the second NLP task in the second language using the machine learning model.

2. The method of claim 1, further comprising:
    selecting the query set; and
    selecting the support set based on the selected query set.

3. The method of claim 1, wherein:
    the support set is drawn from a first training set used for pretraining the machine learning model on a first task; and
    the query set is drawn from a second training set selected for fine-tuning the machine learning model on a second task.

4. The method of claim 1, further comprising:
    identifying a second-phase task set including a second plurality of pseudo tasks, wherein each of the second plurality of pseudo tasks includes a second-phase support set and a second-phase query set; and
    updating the machine learning model in a second phase, wherein the second phase comprises a second-phase inner loop based on the second-phase support set and a second-phase outer loop based on the second-phase query set.

5. The method of claim 4, wherein:
    the second-phase support set and the second-phase query set comprise low-resource language data from a same language.

6. The method of claim 1, further comprising:
    receiving a span of text;
    generating an intent label for the span of text using the machine learning model; and
    generating a slot classification for the span of text using the machine learning model, wherein the second NLP task comprises generating the intent label and the slot classification.

7. The method of claim 1, further comprising:
    receiving a span of text specifying a question; and
    generating an answer to the question using the machine learning model, wherein the second NLP task comprises generating the answer to the question.

8. The method of claim 1, further comprising:
    receiving a query and context text;
    combining the query and the context text to obtain an input text;
    generating a word embedding corresponding to each word of the input text; and
    transmitting a probability corresponding to each word of the input text, wherein the probability indicates whether a corresponding word is a start or end of an answer.

9. The method of claim 1, wherein:
    the first NLP task and the second NLP task comprise intent detection, slot filling, question answering, or any combination thereof.

10. A non-transitory computer readable medium storing code for training a machine learning model, the code comprising instructions executable by at least one processor to:
    identify a task set including a plurality of pseudo tasks, wherein each of the plurality of pseudo tasks includes a support set corresponding to a first natural language processing (NLP) task in a first language and a query set corresponding to a second NLP task in a second language, wherein the first language comprises a high-resource language and the second language comprises a low-resource language that is typologically different from the first language;
    in each of a plurality of iterations of an inner loop, update parameters of a machine learning model based on the support set to obtain an inner-loop parameter, wherein the updating comprises:

computing a support loss for the pseudo task based on the support set;
computing a gradient of the support loss; and
updating the parameters of the machine learning model based on the gradient of the support loss,
in each of a plurality of iterations of an outer loop, update the parameters of the machine learning model based on the query set to obtain an outer-loop parameter, wherein the updating comprises:
computing a query loss for the pseudo task;
summing the query loss over the plurality of pseudo tasks to obtain a query loss sum;
computing a gradient of the query loss sum; and
updating the machine learning model based on the gradient of the query loss sum,
wherein the inner loop is nested within each of the plurality of iterations of the outer loop, and the outer-loop parameter corresponding to each iteration of the plurality of iterations of the outer loop is based on a different inner-loop parameter corresponding to an outcome of the inner loop nested within the iteration of the outer loop; and
perform the second NLP task in the second language using the machine learning model.

11. The non-transitory computer readable medium of claim 10, the code further comprising instructions executable by the at least one processor to:
select the query set; and
select the support set based on the selected query set.

12. The non-transitory computer readable medium of claim 10, the code further comprising instructions executable by the at least one processor to:
identify a second-phase task set including a second plurality of pseudo tasks, wherein each of the second plurality of pseudo tasks includes a second-phase support set and a second-phase query set; and
update the machine learning model in a second phase, wherein the second phase comprises a second-phase inner loop based on the second-phase support set and a second-phase outer loop based on the second-phase query set.

13. An apparatus comprising:
at least one processor; and
at least one memory including instructions executable by the at least one processor to:
identify a task set including a plurality of pseudo tasks, wherein each of the plurality of pseudo tasks includes a support set corresponding to a first natural language processing (NLP) task in a first language and a query set corresponding to a second NLP task in a second language, wherein the first language comprises a high-resource language and the second language comprises a low-resource language that is typologically different from the first language;
in each of a plurality of iterations of an inner loop, update parameters of a machine learning model based on the support set to obtain an inner-loop parameter, wherein the updating comprises:
computing a support loss for the pseudo task based on the support set;
computing a gradient of the support loss; and
updating the parameters of the machine learning model based on the gradient of the support loss,
in each of a plurality of iterations of an outer loop, update the parameters of the machine learning model based on the query set to obtain an outer-loop parameter, wherein the updating comprises:
computing a query loss for the pseudo task;
summing the query loss over the plurality of pseudo tasks to obtain a query loss sum;
computing a gradient of the query loss sum; and
updating the machine learning model based on the gradient of the query loss sum,
wherein the inner loop is nested within each of the plurality of iterations of the outer loop, and the outer-loop parameter corresponding to each iteration of the plurality of iterations of the outer loop is based on a different inner-loop parameter corresponding to an outcome of the inner loop nested within the iteration of the outer loop; and
perform the second NLP task in the second language using the machine learning model.

* * * * *